United States Patent Office 3,487,025
Patented Dec. 30, 1969

3,487,025
RARE EARTH TELLURATE PHOSPHORS
Samuel Natansohn, Massapequa Park, N.Y., assignor to General Telephone & Electronics Laboratories Incorporated, a corporation of Delaware
No Drawing. Filed Sept. 14, 1966, Ser. No. 579,230
Int. Cl. G21c 19/50; C09k 3/00
U.S. Cl. 252—301.1
10 Claims

ABSTRACT OF THE DISCLOSURE

A family of ultraviolet and cathode ray responsive phosphors having a host defined by the general formula, $R_2TeO_6$, where R is an element selected from the group consisting of the rare earth elements yttrium, lanthanum, gadolinium, and lutetium. The host material is activated by an ion selected from the group consisting of uranyl, holmium, erbium, dysprosium, europium, samarium and thulium.

---

This invention relates to phosphors which emit visible light when exposed to incident radiation and, in particular, to phosphors comprising certain rare-earth tellurates as hosts for various luminogens.

Phosphors responsive to ultraviolet and cathode ray excitation are widely used in fluorescent and high pressure mercury discharge lamps and in the manufacture of screens for cathode ray tubes. I have discovered a new family of phosphors which emit radiation in the visible range when exposed to ultraviolet, cathode ray or X-ray excitation. More specifically, these new phosphor compositions consist essentially of a host material defined by the formula $R_2TeO_6$, where R is an element selected from the group consisting of the rare-earths yttrium, lanthanum, gadolinium and lutetium, activated by an ion selected from the group consisting of uranyl, holmium, erbium, dysprosium, europium, samarium and thulium. (While it is recognized that yttrium is not a member of the lanthanide series and therefore is not classified strictly as a rare-earth, it has been grouped with the rare earths lanthanum, gadolinium and lutetium in describing my invention.)

These compounds may be prepared by mixing thoroughly the appropriate rare earth oxides $R_2O_3$ (or any rare earth compound which would yield the rare earth oxide upon thermal decomposition), orthotelluric acid $Te(OH)_6$ (or any other hexavalent tellurium compound which would yield $TeO_3$ upon thermal decomposition) and the activator in the form of an oxide or a salt decomposable to an oxide. This mixture is then heated in a series of steps to a temperature of about 1250° C., temperatures in excess of this amount being avoided since appreciable decomposition with an accompanying loss of luminescence occurs when the materials are heated above 1250° C. The firing is done in an atmosphere of oxygen to maintain the tellurium in the hexavalent state.

The phosphors prepared by this process are powders of white body color which emit radiation characteristic of the incorporated activator when excited by ultraviolet, cathode ray or X-ray radiation. The materials have characteristic X-ray diffraction patterns which are not composites of the X-ray patterns of their constituent starting materials. The actual structure has not been determined but the X-ray data indicates that yttrium, gadolinium and lanthanum tellurates have the same crystallographic structure whereas lutetium tellurate is of different structure. Further, it has been found that an expansion of the lattice takes place with increasing ionic radium of the rare earth cation as indicated by the increase in interplanar spacings (d-values) from $Y^{3+}$ to $Gd^{3+}$ to $La^{3+}$.

The uranyl-activated rare-earth tellurates, yttrium tellurate $Y_2TeO_6:UO_2^{2+}$, lanthanum tellurate

$$La_2TeO_6UO_2^{2+}$$

gadolinium tellurate $Gd_2TeO_6:UO_2^{2+}$, and lutetium tellurate $Lu_2TeO_6:UO_2^{2+}$, all emit light in the green portion of the spectrum when excited by ultraviolet, cathode ray or X-ray radiation. The rare-earth tellurates, when activated by trivalent lanthanide luminogens, emit light of wavelengths characteristic of the transitions in the particular activator ion under the same excitation. For example, holmium or erbium activated lanthanum tellurate emits green light while the same host activated by dysprosium or europium emits yellow or red light respectively.

These latter phosphors may be defined by the formula $R_{(2-x)}A_xTeO_6$, where A is an activator selected from the group consisting of holmium, erbium, dysprosium, europium, samarium and thulium, and $x$ is a value selected to produce the most intense fluorescence when the phosphor composition is excited by a source of external radiation. The value of $x$ for the preferred range of composition is between 0.01 and 0.30.

This brief introduction to the present invention will be more fully understood from the following examples.

EXAMPLE I 5.74 grams of orthotelluric acid $Te(OH)_6$, 5.65 grams of yttrium oxide $Y_2O_3$ and 0.106 gram of uranyl acetate $UO_2(C_2H_3O_2)_2 \cdot 2H_2O$ were mixed and then fired at 800° C. in an oxygen atmosphere. The charge was cooled, homogenized by grinding, and then reheated to 900° C., again in an oxygen atmosphere. The process of cooling, grinding and refiring for four hours in oxygen was carried out two more times, the only difference being that the third and fourth firings were at temperatures of 1000 and 1100° C. respectively. The resulting phosphor $$Y_2TeO_6:0.01\ UO_2^{2+}$$

emits green light under ultraviolet excitation with an emission peak at 515 nanometers and a half-line width of 30 nanometers. Under cathode ray excitation, the emission intensity of the uranyl-activated yttrium tellurate is comparable to that of the known uranyl-activated phosphors lithium oxytungstate $Li_4WO_5:UO_2^{2+}$, and lithium magnesium antimonate 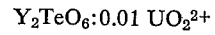 $Li_6Mg_5Sb_2O_{13}:UO_2^{2+}$. While best results were obtained with 0.01 mole of the uranyl ion per mole of tellurate, emission was obtained within a range of 0.005 to 0.10 mole.

EXAMPLE II 5.74 grams of orthotelluric acid $Te(OH)_6$, 9.04 grams of gadolinium oxide $Gd_2O_3$ and 0.106 grams of uranyl acetate $UO_2(C_2H_3O_2) \cdot 2H_2O$ were mixed, heat treated at 800, 900 and 1000° C. for four hours each and subsequently fired at 1100 and 1200° C. for 2 hours each. All firing was done in an oxygen atmosphere and the charge was cooled and ground between firings. The resulting phosphor $GdTeO_6:0.01UO_2^{2+}$ emits green light under ultraviolet and cathode ray excitation with an emission peak at 515 nanometers. Similar results were obtained over a range of 0.005 to 0.05 mole of uranyl ion per mole of tellurate, the optimum concentration being 0.01 mole.

EXAMPLE III

The process of Example I was carried out except that 8.15 grams of lanthanum oxide $La_2O_3$ were added to the mixture in place of the 5.65 grams of yttrium oxide. Also, in addition to the four firings at 800, 900, 1000 and 1100° C., a fifth firing was carried out for 1 hour in oxygen at 1200° C. The resulting phosphor $$LaTeO_6:0.01UO_2^{2+}$$

emits green light under ultraviolet excitation with an emission peak at 510 nanometers. Emission under cathode ray excitation was about the same as that obtained for the phosphor of Example I. The optimum amount of uranyl ion per mole of telurate was 0.01 mole with emission being obtained over a range of 0.0025 to 0.10 mole.

EXAMPLE IV

The process of Example I was carried out except that 9.95 grams of lutetium oxide $Lu_2O_3$ was added to the mixture in place of the 5.65 grams of yttrium oxide. Also, the last firing at 1100° C. was carried out for only one hour instead of the four hours used in Example I. The resulting phosphor $Lu_2TeO_6:0.01UO_2^{2+}$ emits blue-green light under ultraviolet or cathode ray excitation, the major peak emission occurring at 495 nanometers and a secondary peak at 510 nanometers. It is believed that the change in the emission characteristic of the uranyl-activated lutetium tellurate as compared to the uranyl-activated yttrium, gadolinium and lanthanum tellurates is caused by the different crystallographic structure of the lutetium tellurate. As in Example II, emission was obtained over a range of 0.005 to 0.05 mole uranyl ion per mole of tellurate with an optimum concentration of 0.01 mole.

EXAMPLE V 5.74 grams of orthotelluric acid $Te(OH)_6$, 5.50 grams of yttrium oxide $Y_2O_3$, and 0.22 grams of europium oxide $Eu_2O_3$ were mixed and fired at 800, 1000 and 1200° C. in oxygen for four hours each. The charge was cooled and ground between each firing. The resulting phosphor $Y_{1.95}Eu_{0.05}TeO_6$ was found to emit red light under ultraviolet and cathode ray excitation. The experiment was repeated with values of $x$ between 0.05 and 0.20 with similar results.

EXAMPLE VI 5.74 grams of orthotelluric acid $Te(OH)_6$, 9.46 grams of lutetium oxide $Lu_2O_3$, and 0.44 gram of europium oxide $Eu_2O_3$ were mixed and fired at 800, 900 and 1000° C. in oxygen for four hours each. The charge was cooled and ground between each firing. The resulting phosphor $Lu_{1.9}Eu_{0.1}TeO_6$ emits red light under ultraviolet and cathode ray excitation.

EXAMPLE VII

The process of Example VI was repeated except that 8.61 grams of gadolinium oxide $Gd_2O_3$ were substituted from the 9.46 grams of lutetium oxide. The resulting phosphor $Gd_{1.9}Eu_{0.1}TeO_6$ emits red light when excited by ultraviolet or cathode ray excitation.

EXAMPLE VIII

The process of Example V was repeated except that 7.94 grams of lanthanum oxide $La_2O_3$ was substituted for the 5.50 grams of yttrium oxide. The resulting phosphor $La_{1.95}Eu_{0.05}TeO_6$ emitted red light when excited by ultraviolet radiation or cathode rays. The value of $x$ was then varied between 0.05 and 0.30 with similar results.

EXAMPLE IX

A series of phosphors having the general formulation $La_{1.98}A_{0.02}TeO_6$, were A=Sm, Dy, Ho, Er, Tm, were prepared by mixing 8.06 grams of $La_2O_3$ and .74 grams of $Te(OH)_6$ with the appropriate quantity of rare-earth oxide to produce each of the desired phosphors. The resulant mixtures were fired in an oxygen atmosphere at 800 and 1000° C. for four hours each, at 1100° C. for three hours and at 1200° C. for two hours. The quantities of rear-earth oxide $A_2O_3$, together with the color of the emission under ultraviolet excitation is given in the following table.

| Phosphor | $A_2O_3$ | Grams $A_2O_3$ | Emission color |
|---|---|---|---|
| $La_{1.98}Sm_{0.02}TeO_6$ | $Sm_2O_3$ | 0.0872 | Red. |
| $La_{1.98}Dy_{0.02}TeO_6$ | $Dy_2O_3$ | 0.0932 | Yellow. |
| $La_{1.98}Ho_{0.02}TeO_6$ | $Ho_2O_3$ | 0.0945 | Green. |
| $La_{1.98}Er_{0.02}TeO_6$ | $Er_2O_3$ | 0.0956 | Do. |
| $La_{1.98}Tm_{0.02}TeO_6$ | $Tm_2O_3$ | 0.0967 | Blue. |

As many changes could be made in the above described compositions and many different materials could be used without departing from the scope thereof, it is intended that all matter contained in the above described examples and processes be interpreted as illustrative and not in a limiting sense.

What is claimed is:

1. A phosphor composition consisting essentially of a host material defined by the formula $R_2TeO_6$, where R is an element selected from the group consisting of yttrium, lanthanum, gadolinium and lutetium, said host material being activated by an ion selected from the group consisting of uranyl, holmium, erbium, dysprosuim, europium, samarium, and thulium.

2. A phosphor composition as defined by claim 1, wherein the host material is activated by between 0.0025 and .1 mole uranyl ion per mole of tellurate.

3. A phosphor composition as defined by claim 2, wherein the host material is yttrium tellurate activated by between 0.005 and 0.10 mole uranyl ion per mole of tellurate.

4. A phosphor composition as defined by claim 2, wherein the host material is lanthanum tellurate activated by between 0.005 and 0.10 mole uranyl ion per mole of tellurate.

5. A phosphor composition as defined by claim 3, wherein the host material is gadolinium tellurate activated by between 0.005 and 0.05 mole uranyl ion per mole of tellurate.

6. A phosphor composition as defined by claim 3, wherein the host material is lutetium tellurate activated by between 0.005 and 0.05 mole uranyl ion per mole of tellurate.

7. A phosphor composition as defined by claim 1, wherein the host material is activated by approximately 0.01 mole uranyl ion per mole of tellurate.

8. A phosphor composition defined by the formula $R_{2-x}A_xTeO_6$ where R is an element selected from the group consisting of yttrium, lanthanum, gadolinium and lutetium, A is an activator selected from the gorup consisting of holmium, erbium, dysprosium, europium, samarium and thulium, and $x$ is between 0.01 and 0.30.

9. A phosphor composition as defined by claim 8 wherein R is yttrium, A is europium and $x$ has a value between 0.05 and 0.20.

10. A phosphor composition as defined by claim 8 wherein R is lanthanum, A is selected from the group consisting of holmium, erbium, dysprosium, europium, samarium and thulium and $x$ has a value between 0.02 and 0.30.

References Cited

UNITED STATES PATENTS 3,250,722  5/1966  Borchardt _____ 252—301.4

TOBIAS E. LEVOW, Primary Examiner

R. D. EDMONDS, Assistant Examiner

U.S. Cl. X.R.

252—301.4